Sept. 12, 1933.  H. HASTINGS  1,926,808

THERMOMETER

Filed Sept. 28, 1931

INVENTOR
HERBERT HASTINGS
BY
ATTORNEY

Patented Sept. 12, 1933

1,926,808

UNITED STATES PATENT OFFICE 1,926,808

THERMOMETER

Herbert Hastings, Brighton, N. Y.

Application September 28, 1931
Serial No. 565,519

3 Claims. (Cl. 248—30)

This invention relates to thermometers and has for its object to provide an extremely simple and efficient mechanical construction for such an instrument.

Another object of the invention is to provide the instrument with novel means for suspending and supporting it.

These and other objects of this invention will become more readily apparent from the detailed description of the invention, reference being had to the accompanying drawing in which Figure 1 is a front elevation of the thermometer as it appears suspended from a rod or other suitable member.

In the several figures of the drawing like reference numerals indicate like parts.

Figure 2:
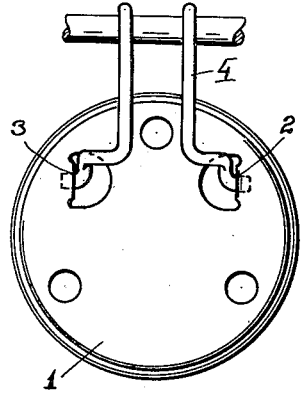
Figure 2 is a rear elevation of the thermometer.
Figure 1:
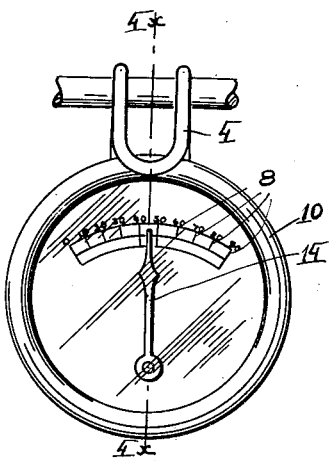
Figure 3:
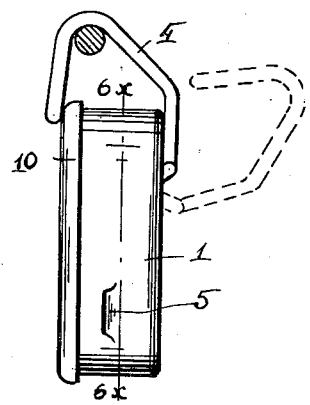
Figure 3 is a side elevation of the thermometer.
Figure 5:
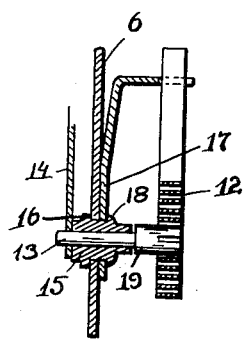
Figure 5 is an enlarged detail sectional view of the combined pointer and thermostatic spring mounting.
Figure 4:
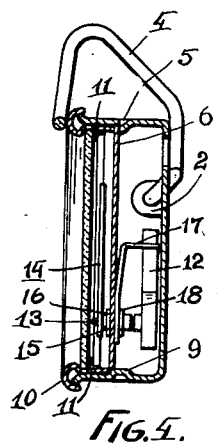
Figure 4 is a vertical sectional view of the thermometer, the section being taken on the line 4x—4x of Figure 1.

The thermometer, forming the subject matter of my present invention, comprises a casing 1 which is preferably cylindrical in shape and is open at the front and closed at the back. From the closed back of the casing 1 are struck inwardly the lugs 2 and 3 which are perforated to provide a pair of bearings into which the ends of the suspension member 4 engage to permit the suspension member to swing on these lugs within the casing.

Struck in from the wall of the casing are a series of lugs 5, 5 which form ledges against which the dial 6 is held to provide a partition within the casing and form an air circulating chamber between it and the closed back of the casing. The dial 6 has suitable calibrations 8, 8 on the face thereof and in order to properly locate these calibrations in a predetermined position with relation to the casing and also to keep the dial from turning after it has been mounted in the casing, another lug 9 is struck in from the wall of the casing to project into the notch 9A provided in the periphery of the dial 6.

The dial 6 is held against the lugs 5, 5 and locked into the casing by means of the bezel 10 which, for this purpose, is provided with the rearwardly extending cylindrical flange 11. This flange is driven into the open end of the casing against the dial 6 to anchor the bezel into the open end of the casing in front of the dial 6 and lock the dial in place within the casing.

The temperature operated indicating device proper is solely supported on the dial 6 and comprises the thermo responsive coiled metal ribbon 12, the pivot shaft 13 and its mounting and the indicator or hand 14. The mounting of the pivot shaft 13 comprises a bushing 15 which has the annular shoulder 16 provided thereon. The bushing is inserted into the hole provided in the dial to receive the bushing until the annular shoulder rests against the face thereof. The perforated end of the bracket 17 is then slipped over the bushing 15 at the back of the dial 6 after which a second shoulder 18 is formed up on the bushing against the bracket to clamp this bracket against the dial and anchor the bushing in the hole of the dial and bracket. The bushing is thus permanently fastened in the dial and projects therethru to provide the bearing for the pivot shaft 13 which has the indicator or hand 14 suitably fastened to one end thereof in front of the face of the dial.

At the back of the dial the pivot shaft has the enlarged cylindrical head 19 formed thereon and this head is slotted longitudinally to receive the inner end of the coiled thermostatic ribbon 12. The inner end of the coiled thermostatic ribbon is suitably fastened in place in the slot in the head of the pivot shaft.

Figure 6:
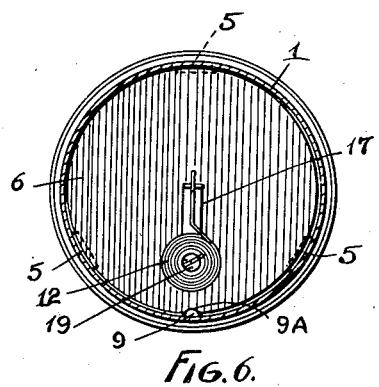
Figure 6 is a vertical sectional view of the thermometer, the section being taken on the line 6x—6x of Figure 3.

The outer end of the thermostatic ribbon is bent to project radially from the head of the pivot shaft as illustrated in Figure 6 and engages into the bifurcated horizontal end of the bracket 17. In this way the outer free end of the thermostatic ribbon is held from turning by the bracket 17 while the inner end of the thermostatic ribbon is free to turn with the pivot shaft 13. On a rise or fall of the temperature the thermostatic ribbon 12 is therefore free to uncoil or coil up and in doing so rotates the pivot shaft 13 in either one direction or the other to have the indicator or hand 14 indicate the change in temperature on the calibrations of the dial.

Combining the bushing 15 and bracket 17 with the dial 6 to permit the mounting of the thermostatic spring and the indicator or hand on the pivot shaft, as illustrated in the drawing and described above, makes it possible to quickly and accurately adjust and set the thermostatic spring by simply turning the bracket 17 until the desired position for it is found.

The thermometer casing illustrated in Figures 1 to 4 inclusive, is provided with the suspension hook 4 with which the thermometer is suspended from a rod forming part of a shelf or grill provided in refrigerators. This suspension hook is formed up of a single piece of wire and its free ends are pivoted in the lugs 3 and 4 as previously pointed out. The ends of the hook member thus have a limited movement within the openings from which the lugs 2 and 3 are struck in. This limited movement of the ends of the suspension hook permits the hook portion thereof to swing from the rear of the casing over the top of it to permit the insertion of a rod into the suspension hook and lock this rod in the closed loop formed by the hook after it is swung on top of the casing. The outer end of the suspension hook slightly overlaps and springs over the edge of the bezel 10 in order to hold the suspension hook fixed in place over the top of the casing.

Figure 7:
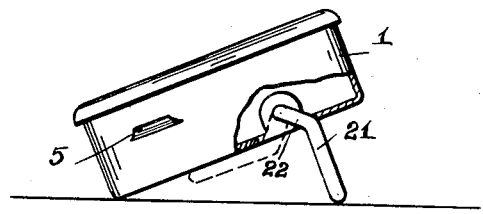
Figure 7 is a side elevation of the thermometer as it appears when supported on a desk or other horizontal surface by means of a modified supporting member.

In place of the suspension hook the casing 1 may be provided with a suitable brace member 21 formed up of a single piece of wire and bent so that the ends thereof are pivoted in the holes provided in the lugs 2 and 3. This brace member is provided with a suitable bend 22 which permits the brace to swing from a parallel position against the back of the casing to an angular position thereof as illustrated in Figure 7. With the brace in the angular position the casing is angularly supported on any table surface so as to make the thermometer readily readable.

I claim:

1. A casing for recording instruments having a closed back, a pair of lugs struck into said casing from said back to provide a pair of openings in said back, bearings formed in said lugs on the inside of said casing and a bail shaped supporting member having its free ends passing thru said pair of openings and mounted in said bearings of said lugs to provide a pivotal connection of said supporting member on said back within the casing with the movement of the supporting member limited by the edge of the openings in said back.

2. A casing for recording instruments having a closed back, a pair of lugs struck into said casing from said back to provide a pair of openings in said back, bearings formed in said lugs on the inside of said casing and a hook shaped bail having its ends pivoted in said lugs, said hook shaped bail being adapted to swing over said housing and engage the front thereof to lock said loop rigidly to said housing and to form a closed loop above said housing for the suspension thereof.

3. In a casing for recording instruments the combination of a hook shaped bail pivotally mounted at the back of said housing and adapted to swing over the top thereof to engage the front of the housing to lock said bale rigidly to said housing and form a closed loop above said housing for the suspension thereof.

HERBERT HASTINGS.